(12) United States Patent
Tanaka et al.

(10) Patent No.: US 7,917,688 B2
(45) Date of Patent: Mar. 29, 2011

(54) FLASH MEMORY MODULE, STORAGE APPARATUS USING FLASH MEMORY MODULE AS RECORDING MEDIUM, AND ADDRESS TRANSLATION TABLE VERIFICATION METHOD FOR FLASH MEMORY MODULE

(75) Inventors: Katsuya Tanaka, Kokubunji (JP); Shuji Nakamura, Machida (JP)

(73) Assignee: Hitachi, Ltd., Tokyo (JP)

( * ) Notice: Subject to any disclaimer, the term of this patent is extended or adjusted under 35 U.S.C. 154(b) by 604 days.

(21) Appl. No.: 12/003,906

(22) Filed: Jan. 3, 2008

(65) Prior Publication Data

US 2008/0172523 A1 Jul. 17, 2008

(30) Foreign Application Priority Data

Jan. 11, 2007 (JP) .................................. 2007-003050

(51) Int. Cl.
*G06F 12/00* (2006.01)
*G06F 13/00* (2006.01)
*G06F 13/28* (2006.01)

(52) U.S. Cl. ................................ 711/103; 711/E12.008

(58) Field of Classification Search .................. 711/103, 711/E12.008
See application file for complete search history.

(56) References Cited

U.S. PATENT DOCUMENTS

| 5,524,231 A * | 6/1996 | Brown ........................... 711/101 |
| 2005/0283598 A1* | 12/2005 | Gaskins et al. .................... 713/2 |
| 2008/0228965 A1* | 9/2008 | Kehne et al. ..................... 710/52 |
| 2009/0100307 A1* | 4/2009 | Lee ............................... 714/746 |

FOREIGN PATENT DOCUMENTS

| JP | 10-283768 | 4/1997 |
| JP | 2003-337757 | 5/2002 |

* cited by examiner

*Primary Examiner* — Sheng-Jen Tsai
(74) *Attorney, Agent, or Firm* — Foley & Lardner LLP

(57) ABSTRACT

An purpose of the invention is to immediately return the operation in a flash memory module from low power consumption mode to regular mode.
A flash memory controller having memory that stores an address translation table for translating between a logical page address and a physical page address in the flash memory chip controls regular mode and low power consumption mode of operating at lower power consumption than in regular mode by halting operation, or decreasing power supply voltage or lowering operating frequency. A flash memory module having the flash memory controller verifies data in the address translation table while low power consumption mode is set.

13 Claims, 13 Drawing Sheets

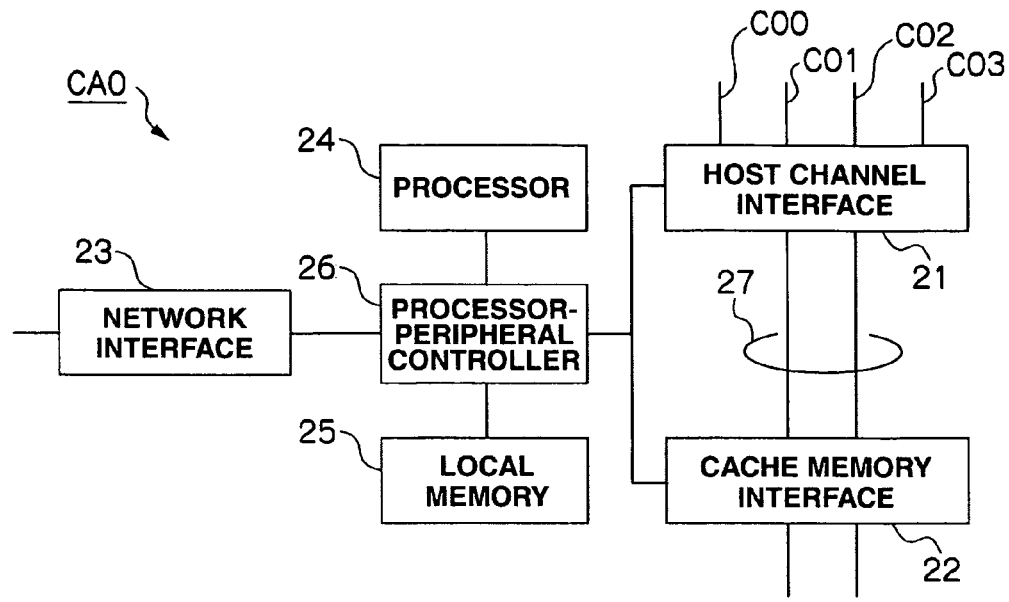
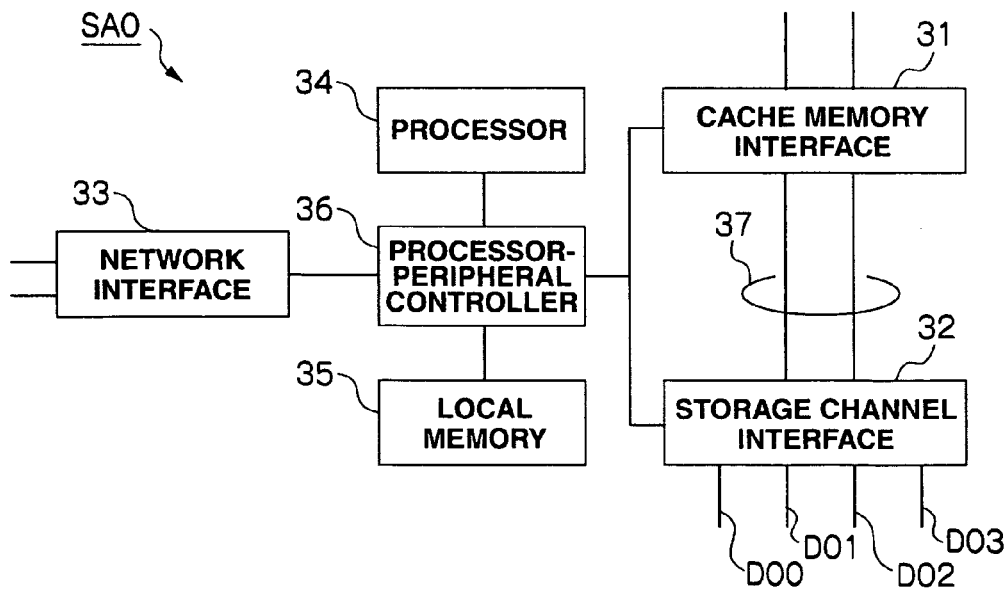

| LOGICAL PAGE ADDRESS (701) | PHYSICAL PAGE ADDRESS (702) | ECC (703) |
|---|---|---|
|  |  |  |
|  |  |  |
|  |  |  |
|  |  |  |
|  |  |  |
|  |  |  |
|  |  |  |
|  |  |  |
|  |  |  |
|  |  |  |

FIG.8

REGISTER A

| MASTER/ SLAVE (801) | EXECUTE/ NOT EXECUTE VERIFICATION (802) | JUDGMENT TIME (803) | STATUS (804) | NUMBER OF UNCORRECTABLE ERRORS (805) |
|---|---|---|---|---|
|  |  |  |  |  |

REGISTER B

| PARAMETER | DKC I/F | RAM | ROM | DMA | FM I/F | μP |
|---|---|---|---|---|---|---|
| 901 | 902 | 903 | 904 | 905 | 906 | |
| 907 POWER SUPPLY VOLTAGE | | | | | | |
| 908 BODY BIAS VOLTAGE | | | | | | |
| 909 OPERATING FREQUENCY | | | | | | |

FLASH MEMORY MODULE, STORAGE APPARATUS USING FLASH MEMORY MODULE AS RECORDING MEDIUM, AND ADDRESS TRANSLATION TABLE VERIFICATION METHOD FOR FLASH MEMORY MODULE

CROSS-REFERENCES TO RELATED APPLICATIONS

This application relates to and claims priority from Japanese Patent Application No. 2007-3050, filed on Jan. 11, 2007, the entire disclosure of which is incorporated herein by reference.

BACKGROUND

1. Field of the Invention

The invention relates to a flash memory module, a storage apparatus using the flash memory module as a storage medium, and an address translation table verification method for the flash memory module, particularly to those suitable for use in verification of an address translation table used for accessing data stored in a flash memory module.

2. Description of Related Art

Generally, a storage apparatus has a randomly accessible nonvolatile storage medium, such as a magnetic disk or an optical disk.

Meanwhile, collectively erasable nonvolatile semiconductor storage media, such as flash memory, have been being developed with the development of semiconductor techniques. In a flash memory module, a flash memory controller in the module refers to an address translation table to translate a logical page address into a physical page address, and stores data to a flash memory chip. Storage apparatuses that use the flash memory module as a storage medium are considered as more favorable in terms of durability, power-save performance, and access time, etc., than storage apparatuses having a number of small disk drives such as magnetic disks.

A method for preventing inappropriate mapping in an address translation table in a flash memory module exists (see Japanese Patent Laid-Open Publication No. 2003-337757). That conventional technique is designed to prevent inappropriate mapping that may occur when valid logical page address data is garbled into invalid data.

As described above, storage apparatuses using a flash memory module as a storage medium are considered as being able to save more power than those using magnetic disks or similar. However, comparing power consumption values in a currently commercial 2.5 inch hard disk drive and in a 2.5 inch hard disk drive compatible flash memory module in an example, the power consumption value during data writing/reading (R/W) in the flash memory module is 2.9 watt, and that in the hard disk drive is 2.3 watt. The power consumption value in the flash memory module is a little larger than that in the hard disk drive. During idling, the power consumption value in the flash memory module is 2.2 watt, and that in the hard disk drive is 1.2 watt. The power consumption value in the flash memory module is about twice that in the hard disk drive.

A flash memory chip itself consumes a very little power, as the power consumption per chip during idling is on the sub-milliwatt level. Accordingly, a large part of the power consumption in the flash memory module during idling can be considered as being derived from the flash memory controller. Therefore, it is essential to conserve the power consumption in the flash memory controller during idling to take advantage of the low power consumption characteristics of the flash memory chip.

Commonly, a flash memory controller is a CMOS LSI (Complementary Metal Oxide Semiconductor Large Scale Integration). In a CMOS LSI, power consumption can be saved by decreasing power supply voltage or lowering operating frequency. Accordingly, it can be assumed that the power consumption in a flash memory will become lower by decreasing power supply voltage, halting operation, or lowering operating frequency in the flash memory controller.

Meanwhile, an address translation table in a flash memory controller is stored in RAM. For example, SRAM (Static Random Access Memory) is used because high-speed access characteristics are required in RAM. In SRAM, soft errors occur due to radiation in some cases, at a very small rate. If the power consumption in a memory controller is lowered, the possibility that a soft error in data written to an address translation table occurs during low power operation mode increases.

To address the thus caused soft errors, data is guaranteed against soft errors generally by adding error correction information to data stored in an address translation table and verifying the address data and the error correction information added to that address data when reading the data. In other words, accessed data in SRAM is guaranteed by the error correction information, but data that is not accessed is not guaranteed against errors. Accordingly, because an address translation table stored in SRAM is not accessed during low power consumption mode involving halt of operation in a flash memory controller, the data cannot be verified by detecting and correcting any soft error that occurs during low power consumption mode. Moreover, during low power consumption mode involving reduced operating frequency too, a soft error cannot be detected unless data in an address translation table is accessed.

A soft error that has occurred during low power consumption mode can be first detected when error data in an address translation table is accessed after returning to regular mode. Therefore, if low power consumption mode continues for a long period of time, soft errors may accumulate in the address translation table and those errors may not be able to be corrected any more from the error correction information. In that case, it is necessary to access a flash memory chip connected to the flash memory controller, read address information, and reconfigure the address translation table in the SRAM. It takes about 1-2 seconds per flash memory chip to reconfigure the address translation table. Therefore, if a large number of chips are connected to a flash memory controller, it takes a long period of time to reconfigure the address translation table. For storage apparatuses, from which high speed access is required, a long time taken to reconfigure the address translation table when returning from low power consumption mode to regular mode is not acceptable.

Japanese Patent Laid-Open Publication No. 2003-337757 lacks consideration for lowering power consumption. Moreover, the technique disclosed in that document cannot address common soft errors that may occur in an address translation table. In other words, that technique is designed to prevent inappropriate mapping that may be made when a valid logical page address is garbled into a invalid logical page address. However, if a valid logical page address is garbled, generally speaking, it is not always garbled into a invalid logical page address. For example, it is possible that a valid logical page address is garbled into another valid logical page address. In that case, errors in the address translation table cannot be verified with the technique disclosed in Japanese Patent Laid-Open Publication No. 2003-337757.

The invention has been made in light of the above described points, and its object is to propose a flash memory module able to immediately return from low power consumption mode to regular mode by verifying data in an address translation table in the flash memory module during low power consumption mode, a storage apparatus using that flash memory module as a storage medium, and a method for verifying an address translation table in the flash memory module.

SUMMARY

The invention provides a flash memory module including a flash memory controller and at least one flash memory chip, the flash memory controller having memory that stores an address translation table for translating between a logical page address and a physical page address in the flash memory chip, and the flash memory controller controlling a first operation of reading/writing data and a second operation of operating in an idling state at lower power consumption than during the first operation by halting operation, decreasing power supply voltage, or lowering operating frequency, wherein data in the address translation table is verified during the second operation.

In that flash memory module, data errors in the address translation table can be detected and corrected by verifying data in the address translation table during low power consumption mode involving any of halting operation, decreased power supply voltage, or lowered operating frequency, and the flash memory module can immediately return from low power consumption mode to regular mode, preventing occurrence of errors that cannot be corrected with error correction information.

With this invention, a flash memory module that can immediately return from low power consumption mode to regular mode by verifying data in an address translation table in a flash memory module during low power consumption mode, a storage apparatus using that flash memory module as a storage medium, and a method for verifying the address translation table in the flash memory module can be provided.

BRIEF DESCRIPTION OF THE DRAWINGS

FIG. 2 is a block diagram showing the channel adapter configuration in the invention.

FIG. 3 is a block diagram showing the storage adapter configuration in the invention.

FIG. 7 is an address translation table in the invention.

FIG. 8 is a diagram showing an example of data stored in the register in the invention.

DETAILED DESCRIPTION OF PREFERRED EMBODIMENTS

An example of a flash memory module, a storage apparatus, and an address translation table verification method for the flash memory module in the invention will be described below with reference to the drawings.

Figure 1:
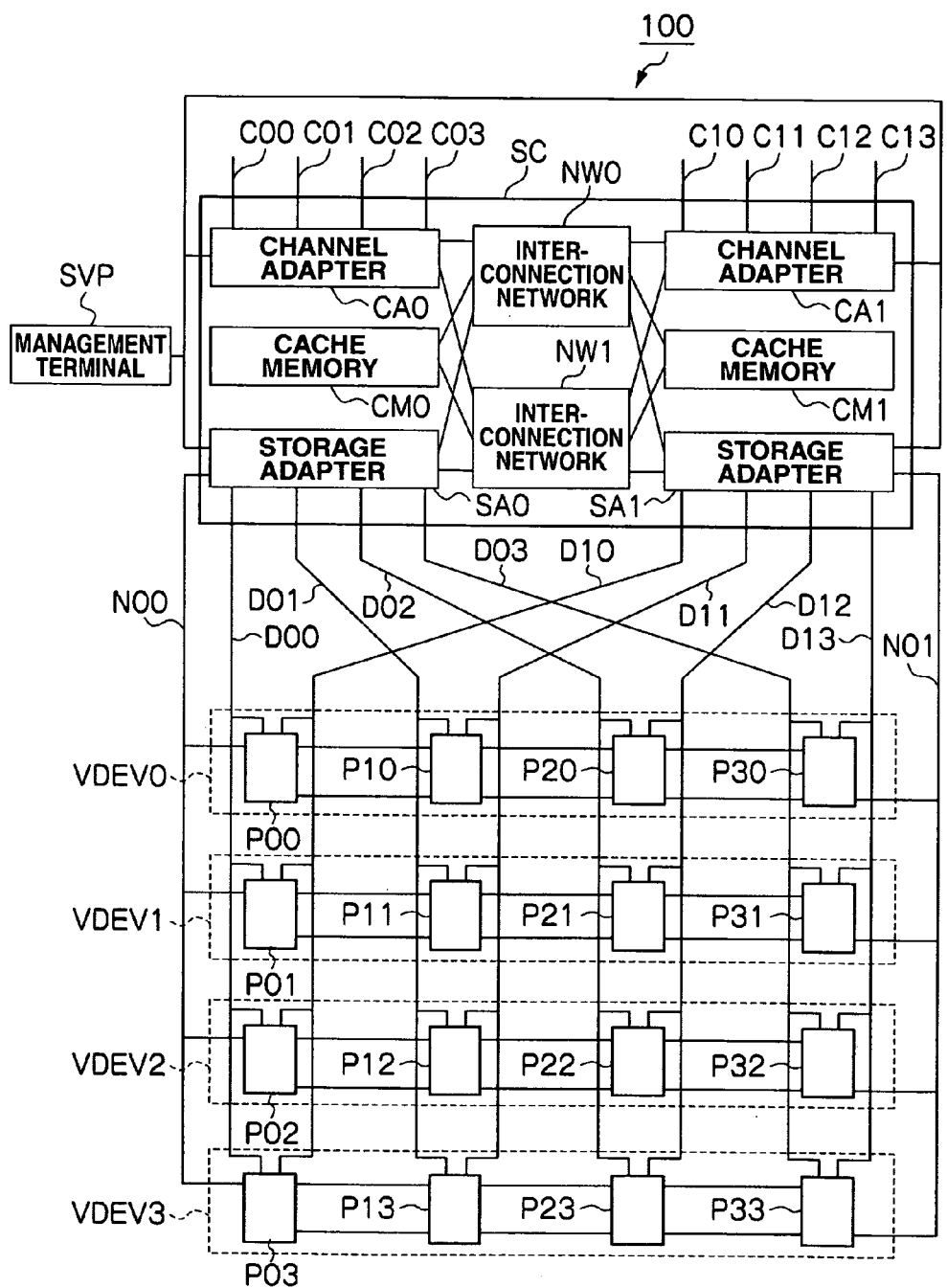
FIG. 1 is a block diagram showing the storage apparatus configuration in the invention.

FIG. 1 is a block diagram showing the configuration of a storage apparatus 100. The storage apparatus 100 includes a storage controller SC and flash memory modules P00-P33.

The storage controller SC includes channel adapters CA0 and CA1, cache memories CM0 and CM1, storage adapters SA0 and SA1, and interconnection networks NW0 and NW1. Although there are only two channel adapters (CA0 and CA1), cache memories (CM0 and CM1), and storage adapters (SA0 and SA1), any number may be provided.

The interconnection networks NW0 and NW1, such as switches, mutually connect devices included in the storage controller SC. More specifically, the interconnection networks NW0 and NW1 mutually connect the channel adapter CA0, cache memory CM0, and the storage adapter SA0, and also mutually connect the channel adapter CA1, cache memory CM1, and storage adapter SA1.

The channel adapter CA0, which will be described later referring to FIG. 2, is connected, via channels C00, C01, C02, and C03, to an external host computer (not shown in the figure). Similarly the channel adapter CA1 is connected, via channels C10, C11, C12, and C13, to the external host computer (not shown). Examples of the host computer include a computer that reads/writes data from/to the storage apparatus 100 in this embodiment.

The cache memories CM0 and CM1 temporarily store data received from the channel adapters CA0 and CA1 and the storage adapters SA0 and SA1.

The storage adapter SA0, which will be described later referring to FIG. 3, is connected to the flash memory module P00 or another one. More specifically, the storage adapter SA0 is connected, via channels D00, D01, D02, and D03, to the flash memory modules P00-P03, P10-13, P20-23, and P30-33, respectively.

Similarly, the storage adapter SA1 is also connected to the flash memory module P00 or another one. More specifically, the storage adapter SA1 is connected, via channels D10, 11, 12, and D13, to the flash memory modules P00-P03, P10-P13, P20-23, and P30-P33.

The channel adapters CA0 and CA1 and the storage adapters SA0 and SA1 are connected to a maintenance terminal SVP. The maintenance terminal SVP sends setting information input by an administrator of the storage apparatus 100 to the channel adapters CA0 and CA1 and/or the storage adapters SA0 and SA1.

The storage apparatus 100 may include a single adapter instead of the storage adapter SA0 and the channel adapter CA0. In that case, the single adapter performs processing for the storage adapter SA0 and the channel adapter CA0.

VDEV0-VDEV3 are RAID (Redundant Arrays of Inexpensive Disks) groups. For example, the RAID group VDEV0 consists of the flash memory modules P00, P10, P20, and P30. If an error occurs in one of the flash memory modules included in the RAID group, e.g. the flash memory module P00, and data cannot be read, the data can be rebuilt from the other flash memory modules P10, P20, and P30 included in the same RAID group.

The flash memory modules P00-P33 are connected, via the networks N00 and N01, to the storage adapters SA0 and SA1, respectively. The storage controller SC controls electric power consumed in the flash memory modules P00-P33 via the networks N00 and N01. The storage adapters SA0 and SA1 can monitor condition settings for low power consumption mode and low power consumption mode status in the flash memory modules P00-P33.

FIG. 2 is a block diagram showing the configuration of the channel adapter CA0. The channel adapter CA0 includes a host channel interface 21, cache memory interface 22, network interface 23, processor 24, local memory 25, and processor-peripheral controller 26.

The host channel interface 21 is an interface connected to an external host computer (not shown) via the channels C00, C01, C02, and C03. The host channel interface 21 mutually converts between the data transfer protocol in the channels C00, C01, C02, and C03 and that in the storage controller SC.

The cache memory interface 22 is an interface connected to the interconnection networks NW0 and NW1. The network interface 23 is an interface connected to the maintenance terminal SVP. The host channel interface 21 and the cache memory interface 22 are mutually connected via a signal line 27.

A processor 24 performs various types of processing by executing programs stored in local memory 25. More specifically, the processor 24 controls data transfer between the host computer (not shown) and the interconnection networks NW0 and NW1.

The local memory 25 stores the programs executed by the processor 24 and tables referred to by the processor 24. Those tables are set or modified by the administrator.

When doing so, the administrator inputs information concerning settings or modification in the tables to the maintenance terminal SVP. The maintenance terminal SVP sends the input information to the processor 24 via the network interface 23. The processor 24 produces or modifies the tables based on the received information, and stores the tables in the local memory 25.

The processor-peripheral controller 26 controls data transfer between the host channel interface 21, cache memory interface 22, network interface 23, processor 24, and local memory 25. Examples of the processor-peripheral controller 26 include a chipset. As the configuration of the channel adapter CA1 is same as that of the channel adapter CA0, its explanation will be omitted.

FIG. 3 is a block diagram showing the storage adapter SA0 configuration. The storage adapter SA0 includes a cache memory interface 31, storage channel interface 32, network interface 33, processor 34, local memory 35, and processor-peripheral controller 36.

The cache memory interface 31 is an interface connected to the interconnection networks NW0 and NW1.

The storage channel interface 32 is an interface connected to the channels D00, D01, D02, and D03, and mutually converts between the data transfer protocol in the channels D00, D01, D02, and D03 and that in the storage controller SC. The cache memory interface 31 and the storage channel interface 32 are mutually connected via a signal line 37.

The network interface 33 is an interface connecting the storage adapter SA0, management terminal SVP, and flash memory modules P00-P33.

The processor 34 performs various types of processing by executing programs stored in the local memory 35.

The local memory 35 stores the programs executed by the processor 34 and tables referred to by the processor 34. The tables are set or modified by the administrator.

When the tables are set or modified, the administrator inputs information concerning setting or modification in the tables to the management terminal SVP. The management terminal SVP sends the input information to the processor 34 via the network interface 33. The processor 34 prepares or modifies the tables based on the received information, and stores the tables in the local memory 35.

The processor-peripheral controller 36 controls data transfer between the cache memory interface 31, storage channel interface 32, network interface 33, processor 34, and local memory 35. Examples of the processor-peripheral controller 36 include a chipset. As the storage adapter SA1 has the same configuration as that of the storage adapter SA0, its explanation will be omitted.

Figure 4:
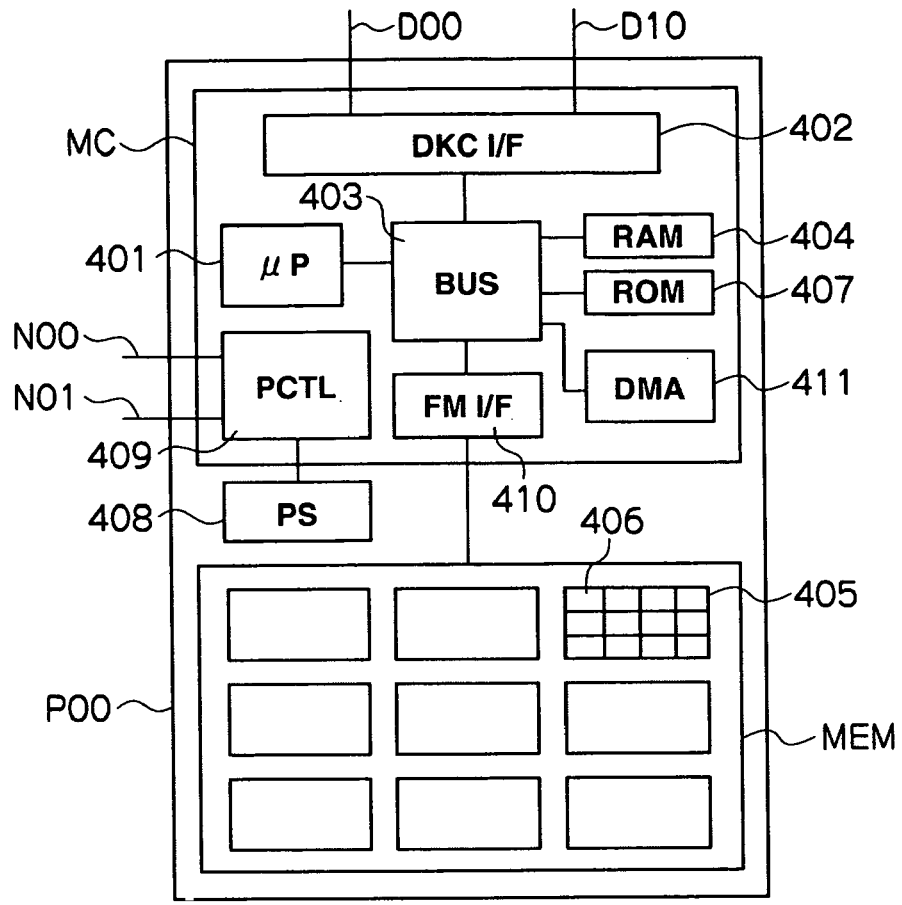
FIG. 4 is a block diagram showing the flash memory module configuration in the invention.

FIG. 4 is a block diagram showing the configuration of the flash memory module P00. The flash memory module P00 includes a flash memory controller MC, flash memory MEM, and power supply (PS) 408. The flash memory MEM stores data. The flash memory controller MC reads, writes, or erases data to/from the flash memory MEM. The power supply 408 converts electric power externally supplied into voltage for use in the flash memory module P00, and supplies the power to the flash memory controller MC and flash memory MEM.

The flash memory controller MC includes a processor (µP) 401, interface unit (DKC I/F) 402, internal bus (BUS) 403, memory (RAM) 404, memory (ROM) 407, power controller (PCTL) 409, flash memory interface unit (FM I/M) 410, and data transfer unit (DMA) 411.

The flash memory MEM includes a flash memory chip 405. The flash memory chip 405 includes blocks 406 and stores data. As will be described later with reference to FIG. 5, a block also constitutes the unit for data erasure performed by the flash memory controller MC.

The interface unit 402 is respectively connected, via the channels D00 and D10, to the storage adapters SA0 and SA1 in the storage controller SC.

The interface unit 402 receives a command from the storage adapters SA0 and SA1. Examples of the command from the storage adapters SA0 and SA1 include a serial-ATA command and an SCSI command. More specifically, the interface unit 402 receives data from the storage adapters SA0 and SA1 and stores the received data in the memory 404. The interface unit 402 also sends data stored in the memory 404 to the storage adapters SA0 and SA1.

The memory 404, such as SRAM, can read/write data at a high speed, and temporarily stores data transmitted/received by the interface unit 402. The memory 407 is a nonvolatile memory and stores programs executed by the processor 401. Those programs are copied from the memory 407 to the memory 404 at start-up of the storage apparatus 100 so that the processor 401 can execute the programs. The memory 404 also stores tables referred to by the processor 401.

Examples of the tables include a table for translating between a logical page address and physical page address for the flash memory MEM. The logical page address is an address used for accessing a page, which is a unit of data read/write in the flash memory MEM, from the external of the flash memory module P00 (e.g., from the storage adapter SA0). The physical page address is an address used by the flash memory controller MC to access a page, which is a unit of data read/write in the flash memory MEM.

An internal bus 403 mutually connects the processor 401, interface unit 402, memory 404, memory 407, data transfer unit 411, and flash memory interface unit 410, and functions as a data transfer path.

The power controller 409 controls power consumption in the flash memory controller MC, and is connected, via the networks N00 and N01, to the storage adapters SA0 and SA1 respectively.

The flash memory interface unit 410 is an interface connecting the flash memory controller MC and the flash memory chip MEM.

The data transfer unit 411 controls read/write data transfer between the flash memory chip MEM and memory 404 under the command of the processor 401. If the function of the data transfer unit 411 is executed by the processor 401, the data transfer unit 411 may be omitted.

The processor 401 performs various types of processing by executing the programs stored in the memory 404. For example, the processor 401 refers to the address translation table (which will be described later referring to FIG. 7) for translating between the logical page address and physical page address in the flash memory MEM stored in the memory 404, and reads/writes data from/to the flash memory MEM.

FIG. 7 is a diagram showing the address translation table stored in the memory 404. The address translation table T1 contains logical page addresses 701, physical page addresses 702 corresponding the logical page addresses 701, and error correction information 703. Examples of the error correction information 703 include Hamming code. Errors can be detected and corrected by using the logical page address 701, physical page address 702, and error correction information 703 stored in the address translation table T1.

The processor 401 performs reclamation processing (block reclamation processing) and wear leveling processing (number-of-erasure leveling processing), which will be described later, on the blocks 406 in the flash memory module P00.

As the other flash memory modules P01-P33 have the same configuration as that of the flash memory module P00, their explanation will be omitted.

Figure 5:
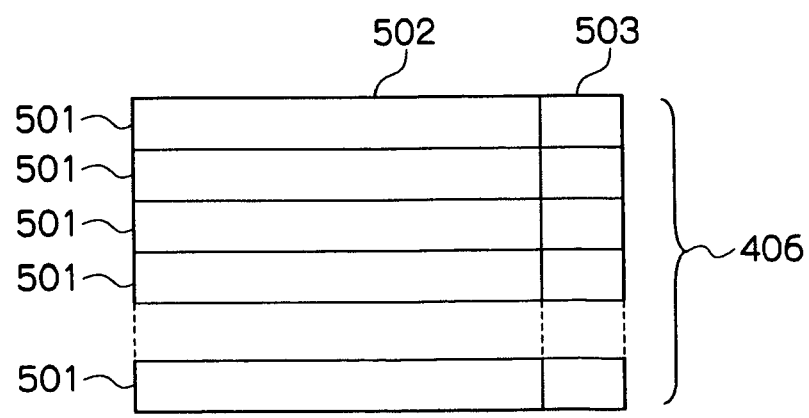
FIG. 5 is a diagram illustrating a block in the flash memory module in the invention.

FIG. 5 is a diagram illustrating the block 406 in the flash memory module P00. The block 406 includes pages 501. Generally, the block 406 includes several dozens of pages 501 (e.g., 64 pages).

The page 501 is a unit of data read/written by the flash memory controller MC. For example, in an NAND-type flash memory, the flash memory controller MC reads data at a speed of 20-30 or less μs/page, writes data at a speed of 0.2-0.3 ms/page, and erases data at a speed of 2-4 ms/block.

Each page 501 includes a data section 502 and redundancy section 503. For example, the page 501 has 2112-byte capacity per page, and includes the data section 502 of 2048 bytes and the redundancy section 503 of 64 bytes. The data section 502 stores normal data. The redundancy section 503 stores management information and error correction information for the page 501.

The management information contains an offset address and page status. The offset address is a relative address in the block 406 the page 501 belongs to. The page status indicates that the page 501 is "valid," "invalid," "unused," or "under processing."

The error correction information is information used for detecting and correcting errors in the page 501, and examples include Hamming code.

Usually, only the flash memory controller MC can access the redundancy section 503 in the page, and the storage adapters SA0 and SA1 can access only the data section 502 in the page. In other words, the logical page address maps the memory space in the data section 502 in the page.

In the flash memory module P00, by its very nature, data "1" can be written over "0" in the block 406 but "0" cannot be written over "1." In other words, the data cannot be modified directly. The flash memory controller MC writes data in an unused page in a block. The processing referred to as "reclamation processing" (block reclamation processing) is processing for saving, to another block, valid data in a first block—in which unused pages are no longer left and so no more data can be written—, and then erasing the data in the first block so that data can be written.

In this way, updating of data in the flash memory module P00 is accompanied by erasure of data in the block 406. However, the time taken to erase one block 406 is longer than the time taken to write data for one page 501 by one power of 10. Accordingly, if one block 406 is erased every time data in the page 501 is updated, the data updating performance in the flash memory module P00 considerably deteriorates. In other words, it is necessary in the flash memory module P00 to use an algorithm with which the erasing time can be reduced.

Also, there is a limitation on the number of erasures possible for the blocks 406 in the flash memory module P00. For example, only up to 100,000 erasures are guaranteed per block 406. Accordingly, in a block 406 where data updating has been concentrated, resulting in the number of times of data erasures being incremented, data becomes inerasable, and that block becomes unavailable. Therefore, wear leveling processing is performed in the storage apparatus 100 using the flash memory module P00 as a storage medium so that erasures do not concentrate in a specific block 406.

For the above described erasure time reduction and wear leveling, address translation processing for translating a logical page address into a physical page address is performed in the flash memory module P00 when data is written. More specifically, the flash memory controller MC translates a logical page address received from a host device (not shown) as a data write target address into a physical page address, which is a real data write address in the flash memory chip, by referring to the address translation table T1 to avoid concentration of data write to a specific physical page address. Therefore, a data guarantee for the address translation table T1 is always required in the flash memory module P00.

For the above described reclamation processing or wear leveling processing, in some cases the data written to the flash memory module P00 is moved in the flash memory module P00 without a command from the storage controller SC. If the result of the data movement is correctly reflected in the address translation table storing the logical and physical page addresses, the storage controller SC becomes able to access the appropriate data.

However, if a soft error occurs in data in the address translation table T1 because of data garbling in the table caused by radiation or similar, the error occurs in a data read/write target address in the flash memory module P00, so the storage controller SC cannot read the appropriate data.

Figure 6:
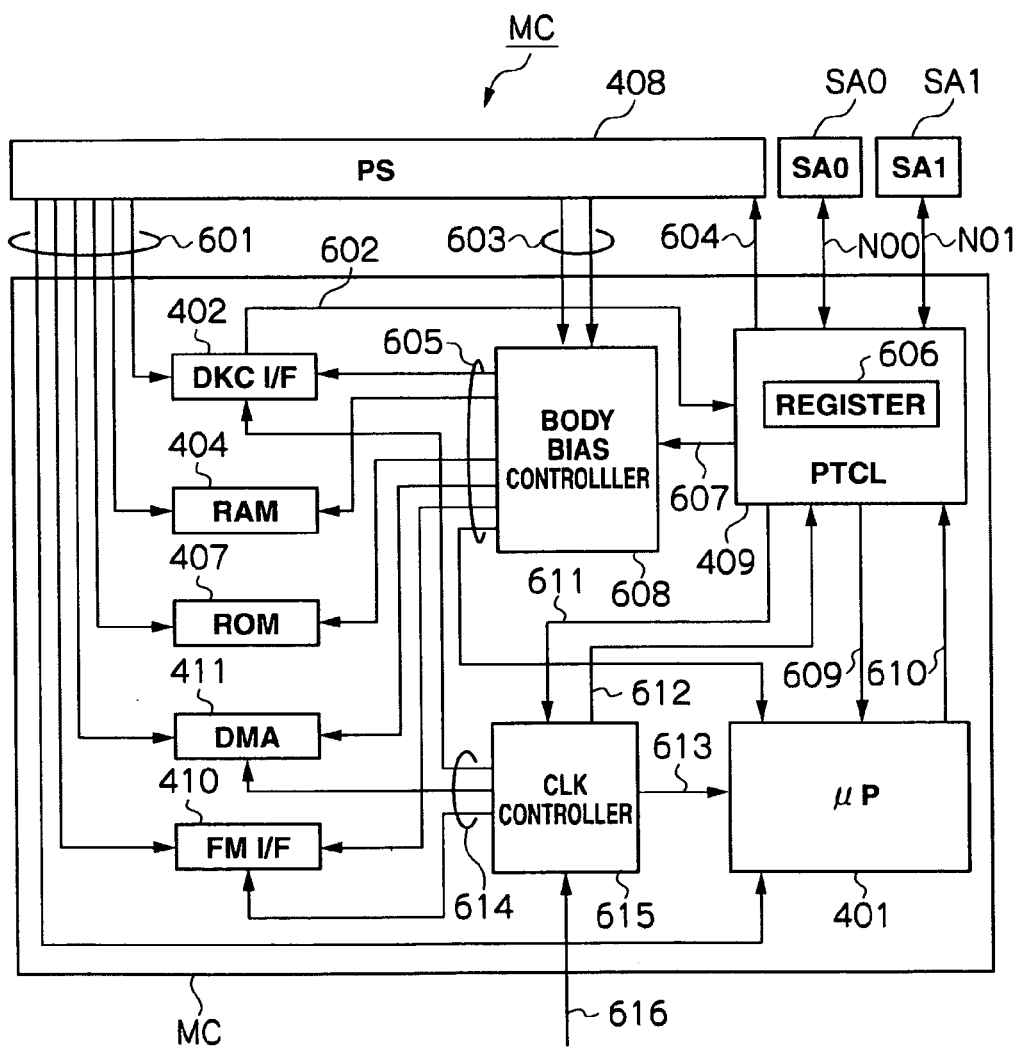
FIG. 6 is a diagram illustrating components relating to power consumption control in the flash memory controller in the invention.
Figures 9, 10:
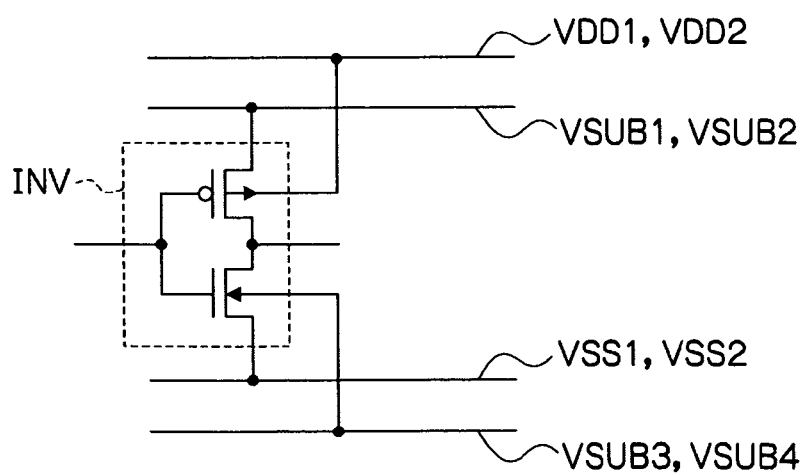
FIG. 9 is a diagram showing an example of data stored in the register in the invention.
FIG. 10 is a diagram illustrating power supply voltage and body bias in the invention.

Next, power consumption control in the flash memory controller MC will be described. FIG. 6 is a diagram illustrating the components relating to the power consumption control in the flash memory controller MC. The power controller 409 has a register 606 for setting operating conditions during low power consumption mode. The data to be stored in the register 606 will be described later (FIGS. 8 and 9). The data stored in the register 606 can be set and monitored, via the networks N00 and N01, from the storage adapters SA0 and SA1.

The power supply 408 reads, via the signal line 604, the set conditions stored in the register 606, and supplies electric power, via the chip power supply lines 601, to the processor 401, interface unit 402, memory 404, memory 407, flash memory interface unit 410, and data transfer unit 411 according to the set conditions. The power supply 408 also the supply power for body biasing via the chip power supply line 603. A body bias controller 608 reads the set conditions stored in the register 606 via the signal line 607 and distributes body biasing power, via a chip power supply line 605, to the processor 401, interface unit 402, memory 404, memory 407, flash memory interface unit 410, and data transfer unit 411 in the flash memory controller MC.

A clock controller 615 reads the set conditions stored in the register 606 via a signal line 611, converts, according to the set conditions, a reference clock signal input from the signal line 616, and distributes the converted clock signal to the processor 401, interface unit 402, power controller 409, flash memory interface unit 410, and data transfer unit 411 via signal lines 612, 613, and 614.

The processor 401 sends a signal for determining whether or not to permit the power controller 409 to interrupt via the signal line 610. The power controller 409 sends an operation halt signal or operation resumption signal to the processor 401 via the signal line 609.

If the interface unit 402 receives a low power consumption command, such as Serial-ATA Slumber command or SCSI Start/Stop Unit command, the interface unit 402 notifies, via the signal line 602, the power controller 409 of reception of the low power consumption command.

FIGS. 8 and 9 are diagrams illustrating the data stored in the register 606 in the power controller (PCTL) 409. The register 606 in the power controller 409 includes register A (FIG. 8) and register B (FIG. 9).

FIG. 8 is a diagram illustrating the data stored in the register A. The register A mainly stores parameters for controlling conditions for shift of the flash memory modules P00-P33 to low power consumption mode. A parameter 801 sets whether the flash memory modules P00-P33 automatically shift to low power consumption mode, or shift to low power consumption mode according to a command received from the storage adapter SA0 or SA1, etc., or both.

The parameter 802 sets whether or not data verification is to be performed on the address translation table T1 during low power consumption mode. If the data verification is not performed on the address translation table T1, the power consumption becomes lower than when the data verification is performed but address information has to be re-read from the flash memory chip 405 when returning to regular mode.

The parameter 803 stores shift conditions applied if the automatic mode is set for shifting to low power consumption mode in the parameter 801. For example, if no access is made to the flash memory modules P00-P33 within the time stored in the parameter 803 and the parameter 801 is set to the automatic mode, the flash memory modules P00-P33 automatically shift to low power consumption mode.

The parameter 804 indicates whether the current operation is regular mode or low power consumption mode. The storage adapters SA0 and SA1 can find the operation status of the flash memory modules P00-P33 by checking the parameter 804. The parameter 805 indicates the number of errors that has occurred in the address translation table T1, that cannot be corrected only with the error correction information.

FIG. 9 is a diagram illustrating data stored in the register B. The register B stores parameters for controlling operating conditions for the flash memory modules P00-P33 during low power consumption mode. Items 901-906 in the register B indicate power control targets in the flash memory controller MC. Items 907-909 show operating conditions changed for lowering power consumption. The items 907 and 908 indicate the conditions of power supply voltage and body bias voltage supplied to the processor 401, interface unit 402, memory 404, memory 407, and flash memory interface unit 410, and data transfer unit 411 during low power consumption mode. The power supply voltage and body bias voltage will be described later. The item 909 indicates the operating frequencies of the processor 401, interface unit 402, memory 404, memory 407, flash memory interface unit 410, and data transfer unit 411 during low power consumption mode. The lower the operating frequency is, the greater the power consumption lowering effect is. To halt the operation, the frequency is set to "0." The items 902 and 903 are control parameters for the memory (RAM 404 and ROM 407). Since the operating frequency of the memory (RAM 404 and ROM 407) is determined based on the access signal frequency, the operating frequency during low power consumption mode does not have to be set.

FIG. 10 is a diagram illustrating the power supply voltage and body bias voltage. To the inverter circuit INV, positive chip power supply VDD1 or VDD2, negative chip power supply VSS1 or VSS2, positive body bias VSUB1 or VSUB2, and negative body bias VSUB3 or VSUB4 are supplied. It is assumed that VDD1, VSS1, VSUB1, and VSUB3 represent the power supply voltage supplied to the circuit during regular mode, and VDD2, VSS2, VSUB2, and VSUB4 represent the power supply voltage supplied to the circuit during low power consumption mode.

For example, during regular mode, power is supplied to the circuit with prescribed voltage where VDD=VSUB1 and VSS1=VSUB3. Meanwhile, during low power consumption mode, power is supplied with voltage under the conditions where VDD1>VDD2 and VDD2<VSUB2, and VSS2≧VSS1 and VSS2>VSUB4. The operating power of the circuit is lowered by lowering the power supply voltage, and appropriate body bias application lowers the power consumption due to leak current reduction.

Figure 11:
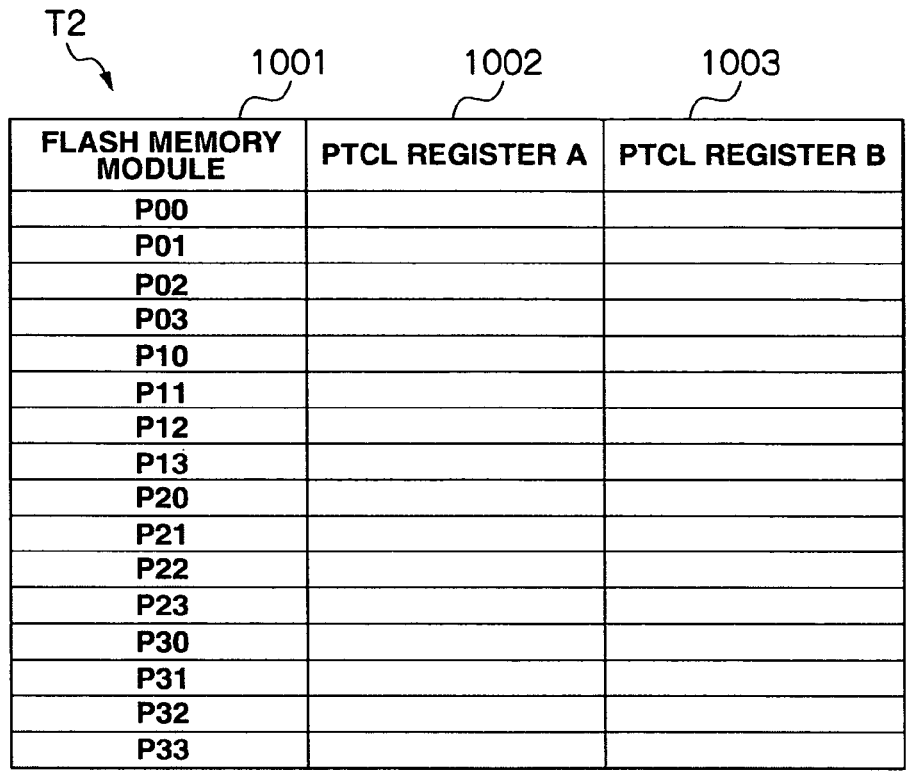
FIG. 11 is a diagram showing the flash memory module management table in the invention.
Figure 12:
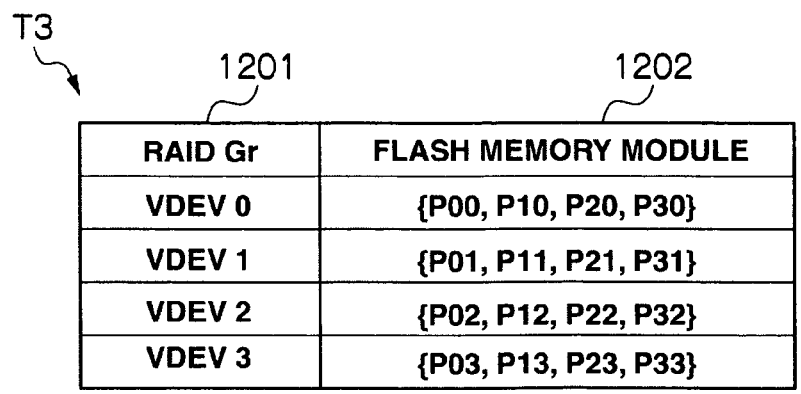
FIG. 12 is a diagram showing the RAID group management table in the invention.

FIG. 11 is a diagram illustrating the flash memory module management table T2 managed in the storage adapter SA0 or SA1. The storage adapters SA0 and SA1 can monitor or modify the settings of the content of the registers A and B by accessing the flash memory modules P00-P33 via the network N00 or N01. The flash memory module management table T2 shown in FIG. 11 stores, to manage the parameters stored in the registers A and B in each flash memory module P00-P33, a flash memory module identifier 1001, the register A content 1002, and the register B content 1003 in each flash memory module P00-P33. FIG. 12 is a diagram illustrating a RAID group management table T3 managed in the storage adapter SA0 or SA1.

The RAID group management table T3 shown in FIG. 12 stores a RAID group identifier 1201 and a group 1202 of the flash memory module identifiers that form each RAID group.

Figure 17:
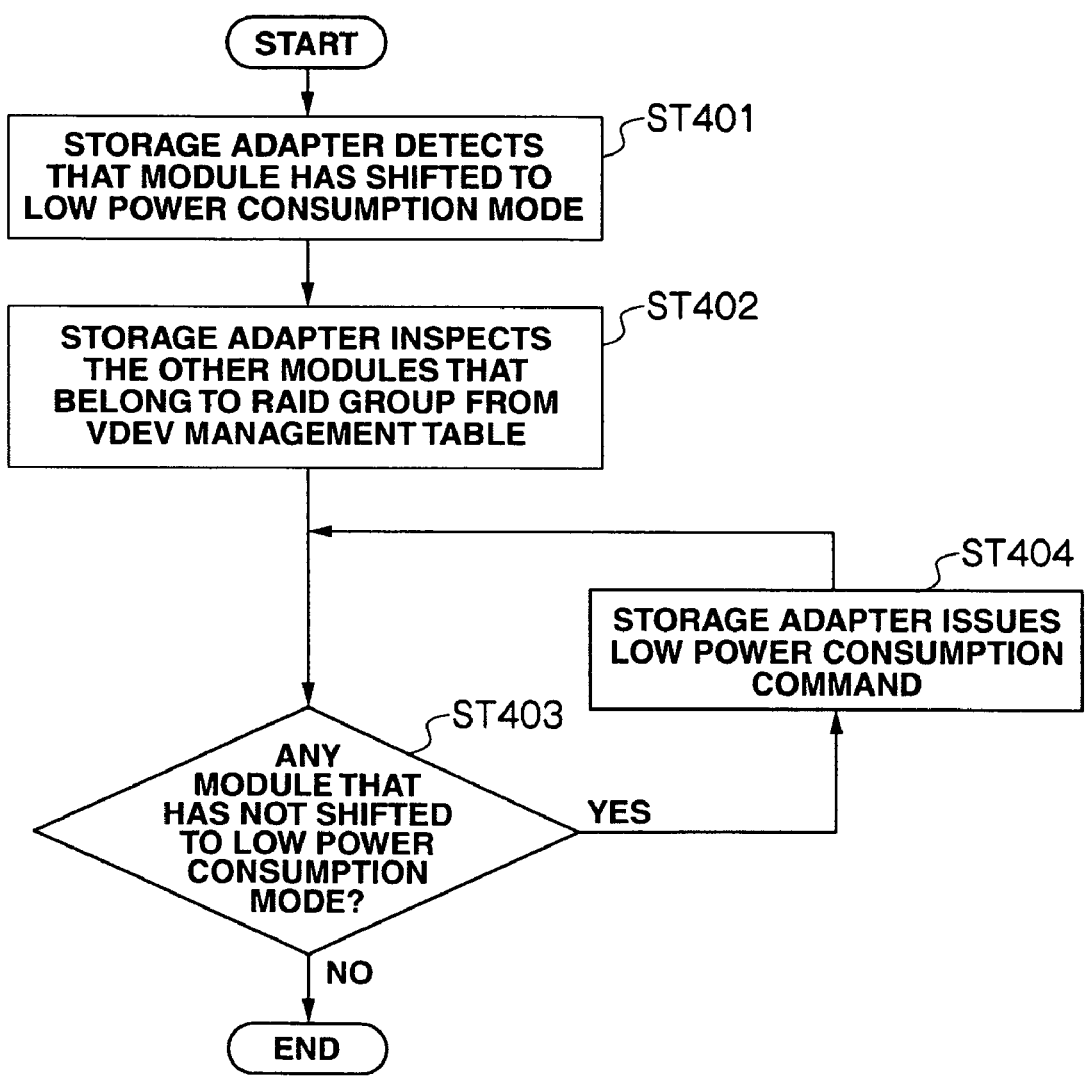
FIG. 17 is a flowchart illustrating the method for having all flash memory modules in a RAID group shift to low power consumption mode in the invention.
Figure 18:
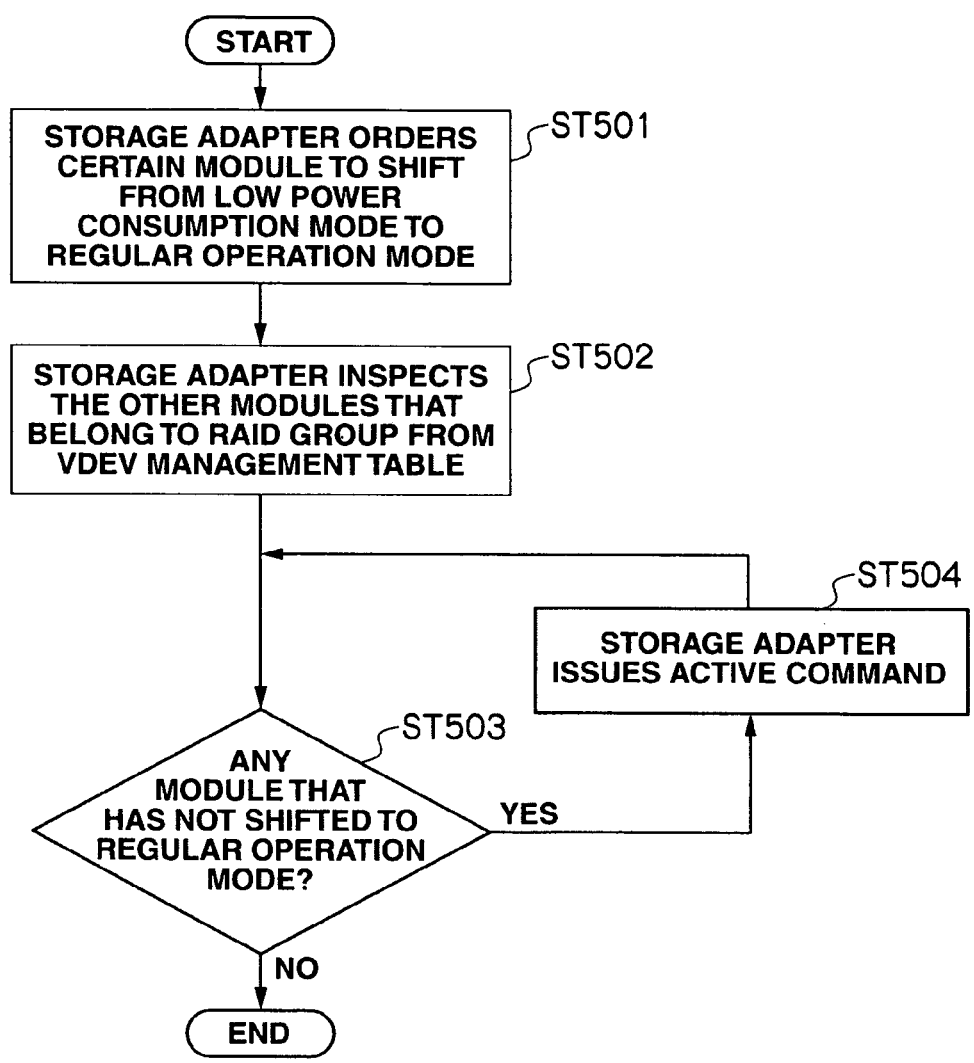
FIG. 18 is a flowchart illustrating the method for having all flash memory modules in a RAID group shift to regular mode in the invention.

The RAID group management table T3 is used in the flowcharts in FIGS. 17 and 18 that will be described later.

Figure 13:
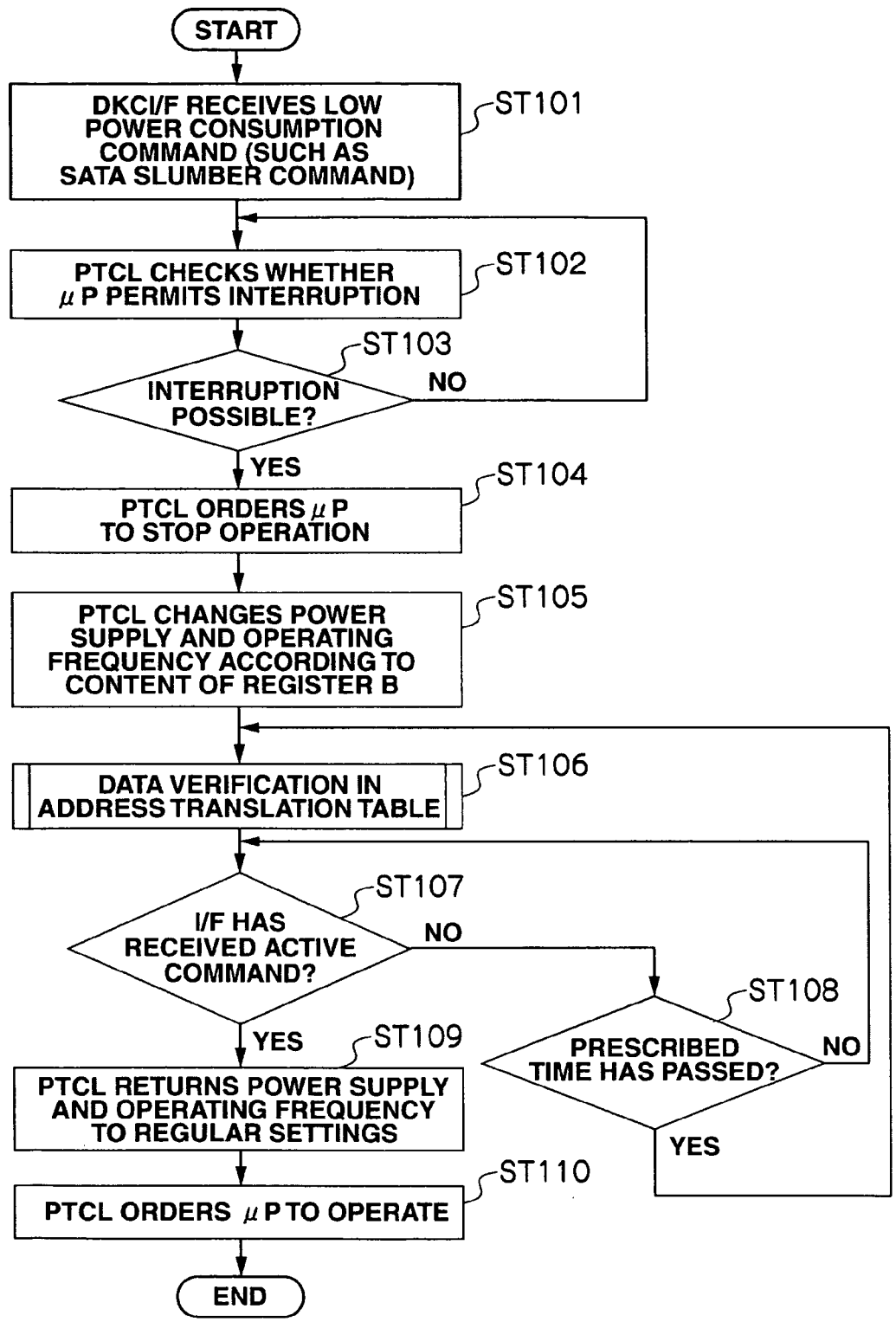
FIG. 13 is a flowchart illustrating low power consumption mode in the flash memory module in the invention.

FIG. 13 is a flowchart illustrating low power consumption mode in the flash memory module P00. As the same operation as in the flash memory module P00 is performed in the other flash memory modules P01-P33, its explanation will be omitted. The flowchart in FIG. 13 shows the processing performed when reception of a command sent externally triggers shifting to low power consumption mode in the flash memory module P00.

In step ST101, the interface unit 402 receives a low power consumption command from, for example, the storage adapter SA0 or SA1. Examples of that command include S-ATA Slumber command or SCSI Start/Stop Unit command. The interface unit 402 notifies the power controller 409 of reception of the low power consumption command.

In step ST102, the power controller 409 checks whether or not the processor 401 permits interruption.

In step ST103, if interruption is not permitted (ST103: NO), the processing returns to step ST102 and the power controller 409 waits for interruption permission. Examples of the factors for interruption being not permitted include that the processor 401 is executing the wear leveling processing for the flash memory chip 405. The reason is that in some cases the processor 401 executes the wear leveling processing during the time period where there is no access for data read/write. In this embodiment, the flash memory module P00 does not shift to the power consumption operation during execution of the wear leveling processing but waits for the completion of that processing. In other words, as will be described later, the flash memory module P00 shifts from regular mode to low power consumption mode and data verification in the address translation table T1 is performed after the wear leveling processing ends.

In step ST103, if the processor 401 permits interruption (ST103: YES), the processings proceeds to step ST 104. In step ST104, the power controller 409 gives an operation halt order to the processor 401 via the signal line 609.

In step ST105, the power controller 409 modifies the power supply voltage, body bias voltage, and clock frequency according to the set conditions in the register 606.

In step ST 106, the processor 401 executes the data verification in the address translation table T1. The detail of step ST106 will be described later referring to the flowchart in FIG. 14.

In step ST107, whether or not the interface unit 402 has received a command (active command) to return from low power consumption mode to regular mode is checked. If the active command has been received (ST107: YES), the processing proceeds to step ST109.

In step ST109, the power controller 409 restores the power supply voltage, body bias voltage, and clock frequency to return to regular mode. In step ST110, the power controller 409 commands the processor 401 to restart operation.

If the active command has not been received in step ST107 (ST107: NO), the power controller 409 waits for a prescribed period of time in step ST108. Within the prescribed period of time, the power controller 409 repeats step ST107 and executes data verification in the address translation table T1 in step ST106 in a fixed cycle. If the power consumption in the power controller 409 is sufficiently smaller than that in the processor 401, the power consumption in the flash memory controller MC can be lowered by reducing the ratio of the time period for the data check in the address translation table T1 performed by the processor 401.

Figure 15:
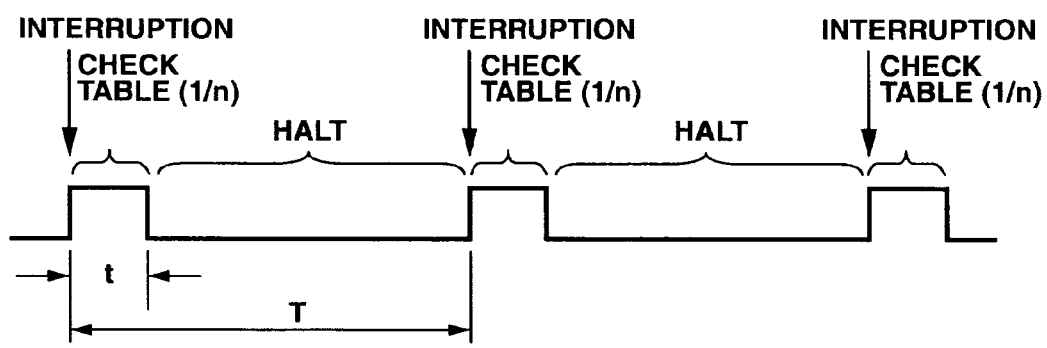
FIG. 15 is a diagram illustrating execution of data verification for the address translation table at low duty cycle according to the invention.

FIG. 15 is a time chart illustrating execution of data verification in the address translation table T1 at low duty cycle.

The processor 401 executes the data verification in the address translation table T1 one portion (1/n) at a time so that the halt period is longer than the data verification period, i.e., at low duty cycle.

As shown in FIG. 15, the cycle of execution of the data verification in the address translation table T1 performed by the processor 401 on a prescribed range at a time is represented by "T." Within cycle T, the time period in which the processor 401 verifies data in the prescribed range of the address translation table T1 is represented by "t." Cycle T and time period t, or cycle T and the prescribed range are set under the following three conditions.

First, the first condition, i.e. the setting condition of cycle T will be described. The time taken for the flash memory modules P00-P33 in this embodiment to return from low power consumption mode to regular mode is the sum of cycle T and the time period taken, when the processor 401 is operating, for the flash memory modules P00-P33 to shift to regular mode after receiving the active command. Cycle T is set so that the above sum is equal to or less than the waiting time acceptable for the specifications of the storage apparatus 100.

Next, the second condition, i.e. the set condition a of time period t or the data verification range performed within time period t will be described. Cycle T and time period t, or cycle T and the range of data verification executed by the processor 401 within time period t are determined so that the average power consumption during low power consumption mode accompanied by the data verification is an acceptable power consumption for the storage apparatus 100 or less, in light of the time taken by and the power consumed by the processor 401 for the data verification in the prescribed range.

Next, the third condition, i.e. the set condition b of time period t or the range of data verification executed within time period t will be described. Cycle T and time period t, or the range of data verification executed by the processor 401 within cycle T and time period t are determined so that all data in the address translation table T1 is verified at least once within the time period in which a one-bit soft error is statistically expected to occur in the address translation tables T1 in all flash memory modules P00-P33 mounted in the storage apparatus 100.

Figure 14:
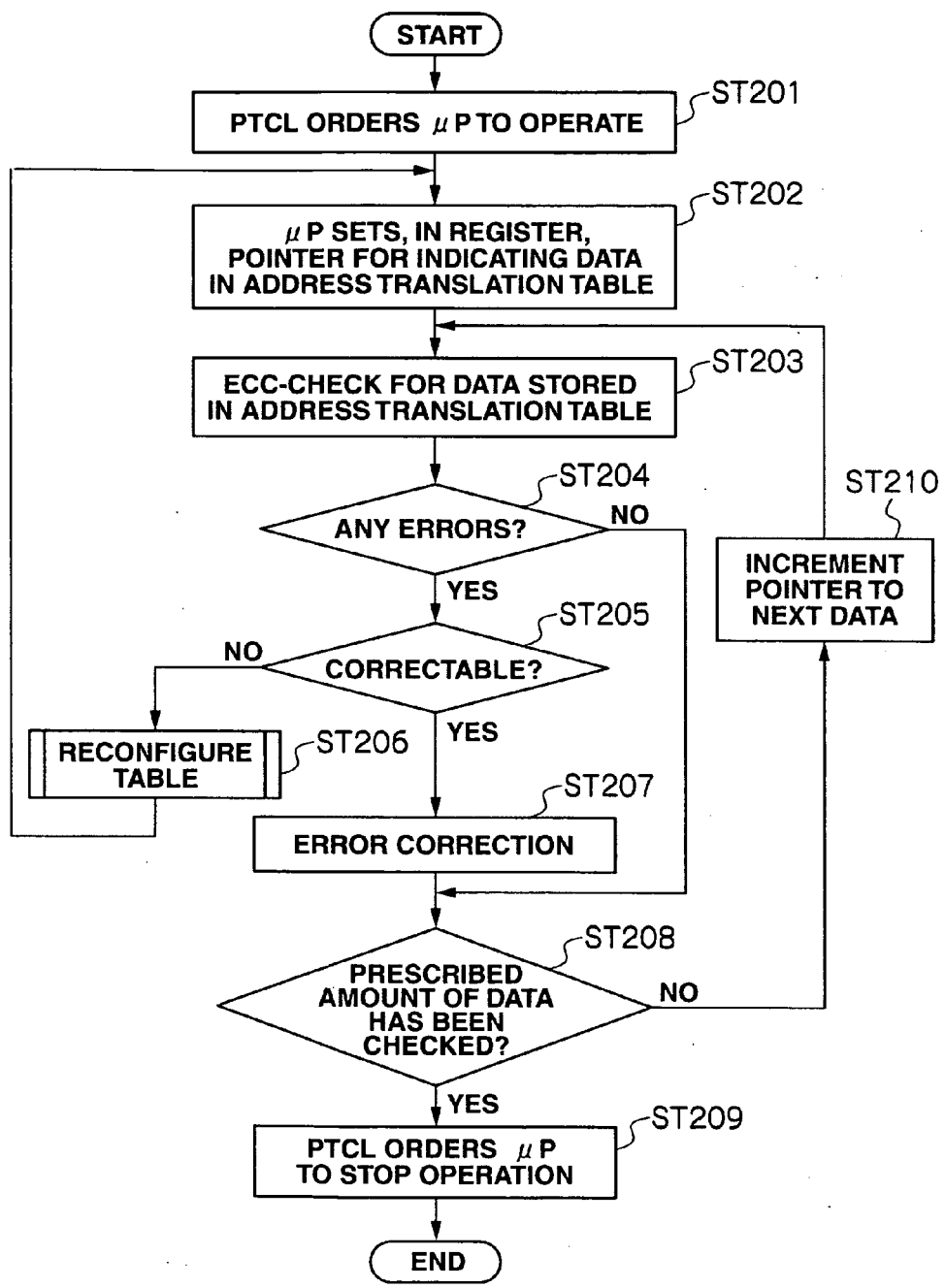
FIG. 14 is a flowchart illustrating data verification in the address translation table performed during low power consumption mode in the invention.

FIG. 14 is a flowchart illustrating data verification (step ST106) in the address translation table T1 performed in the flash memory module P00 during low power consumption mode in this embodiment.

In step ST201, the power controller 409 shifts the operating condition of the processor 401 and the memory 404 to regular mode and commands the processor 401 to restart operation. If data verification in the address translation table T1 can be performed while the processor 401 and memory 404 maintain low power consumption mode, the operating condition does not have to be shifted. In step ST202, the processor 401 sets, in the register, a pointer to the data subjected to the data verification in the address translation table T1.

In step ST203, the logical page address, physical page address, and error correction information stored in the table is checked, and whether or not there are any errors is determined in step ST204. If no error is found in step ST204 (ST204: NO), the processing proceeds to step ST208. If a prescribed amount of data has been checked in step ST208 (ST208: YES), the processing proceeds to step ST209.

In the flash memory module P00 in this embodiment, all data in the address translation table T1 is not sequentially verified at a time, but execution of the data verification is divided into several time periods to reduce the average power consumption. In step ST209, the power controller 409 commands the processor 401 to halt operation. If the processor 401 and memory 404 have been shifted to regular mode in step ST201, the processor 401 and memory 404 are shifted again to low power consumption mode.

In step ST208, if verification on the prescribed amount of data has not yet finished (ST208: NO), a pointer for indicating the next data in the address translation table T1 is set in the register in step ST210, and the processing returns to step ST203.

If any error is detected in step ST 204 (ST204: YES), whether or not the error can be corrected is determined in step ST205. If the error can be corrected with the error correction information that has been added to the data (ST205: YES), the processing proceeds to step ST207 and executes error correction.

Meanwhile, if the error cannot be corrected from the error correction information, e.g. if the number of bits where the error has occurred is large (ST205: NO), table reconfiguration processing in step ST206 is executed and the processing returns to step ST202.

Figure 16:
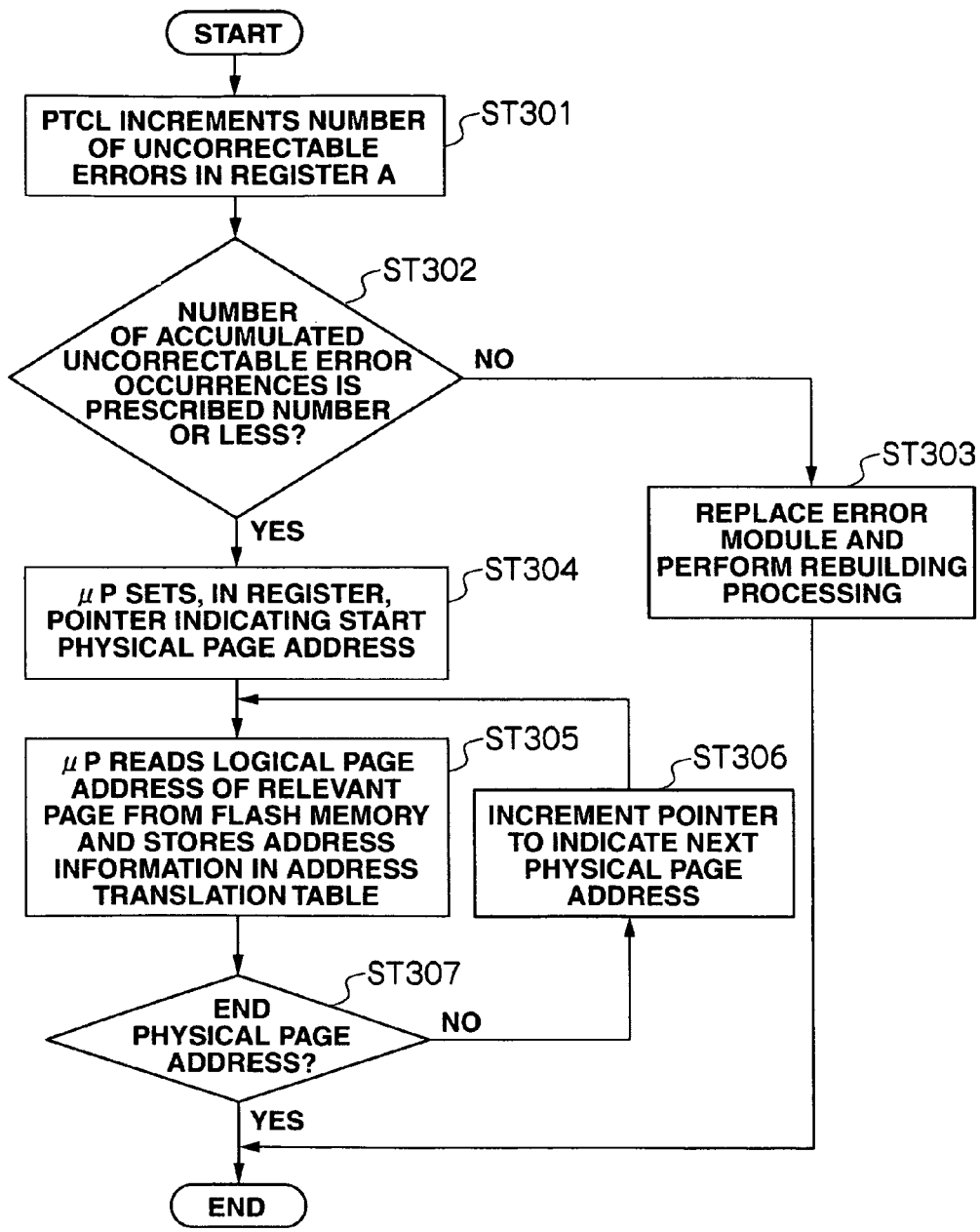
FIG. 16 is a flowchart illustrating the table reconfiguration processing in the invention.

Next, the table reconfiguration (step ST206) will be described. FIG. 16 is a flowchart illustrating the table reconfiguration processing.

In step ST301, the power controller 409 increments the number of uncorrectable error occurrences in the parameter 805 in the register A, and checks whether or not the value in the parameter 802 is a prescribed value or less in step ST302. If the number of error occurrences exceeds the prescribed value (ST302: NO), the processing proceeds to step ST303.

In step ST303, the flash memory module (defective module) in which the number of error occurrences exceeds the prescribed number is replaced and data is rebuilt in a spare flash memory module (not shown). For example, if RAID level is 5th, this rebuilding is processing for performing an exclusive OR calculation by having the storage adapter SA0 or SA1 read data in the flash memory module that belongs to the same RAID group as the defective module to reproduce the data that has been stored in the defective module.

The rebuilding can be done quickly by connecting the spare flash memory module to the storage adapter SA0 or SA1 in advance. The spare flash memory module prepares, when connected to the storage adapter SA0 or SA1, the address translation table T1 in its flash memory controller and is set to a standby state in low power consumption mode, which is accompanied by execution of the data verification (ST106, FIG. 13) in the address translation table T1 in FIG. 13. By setting the spare flash memory module to the standby state, it can be used immediately when necessary.

If the number of error occurrences is the prescribed number or less (ST302: YES), the processing proceeds to step ST304. In step ST304, the processor 401 sets a pointer to the start physical page address in the flash memory module P00.

In step ST305, the processor 401 reads logical page address information based on the physical page address and stores the address information in the address translation table T1.

In step ST307, whether or not the pointer set in the processor 401 has reached the end physical page address is checked. If the pointer is not indicating the end physical page address in step ST307 (ST307: NO), the pointer is moved so that the processor 401 can access the next physical page address in step 306.

In step ST307, the processing ends if the address check has been completed up to and including the end physical page address (ST307: YES).

As cases where the number of error occurrences stored in the parameter 805 in the register A exceeds the prescribed number, two cases are conceivable: i.e., the case where the accumulated number of errors including the past data verification results exceeds the prescribed number, and the case where several errors occur during one check and exceed the prescribed number.

Next, the method with which the storage apparatus 100 in this embodiment has all flash memory modules in RAID groups (VDED0-VDEV3) shift to low power consumption mode will be described. FIG. 17 is a flowchart illustrating the method.

The storage adapter SA0 or SA1 reads/writes data from/to the flash memory modules in the RAID group (for example, VDED0: flash memory modules P00, P10, P20, P30) almost synchronously. Accordingly, the point in time when the flash memory modules in the RAID group shift to low power consumption mode is also synchronous. As an example, the case where the automatic mode is set for low power consumption mode in the flash memory module P00 will be considered below.

In step ST401, the storage adapter SA0 or SA1 detects the shift of any flash memory module, e.g., the flash memory module P00, to low power consumption mode. That detection is enabled by having the storage adapter SA0 or SA1 monitor the register A in each flash memory module P00-P33.

In step ST402, the storage adapter SA0 or SA1 accesses the RAID group management table T3 illustrated in FIG. 12, and inspects the flash memory modules P10, P20, and P30 that belong to the same RAID group (VDEV0) as the flash memory module P00 that has shifted to low power consumption mode.

In step ST403, whether or not there is any flash memory module that has not shifted to low power consumption mode in that RAID group (VDEV0) is checked.

If any of those flash memory modules has not shifted to low power consumption mode in step ST403 (ST403: YES), the processing proceeds to step ST404 and the storage adapter SA0 or SA1 issues a low power consumption command to the flash memory module in the RAID group that has not shifted to low power consumption mode. Then the processing returns to step ST403.

In step ST403, if there is no flash memory module that has not shifted to low power consumption mode, i.e., if all flash memory modules P10, P20, and P30 in the RAID group (VDEV0) have shifted to low power consumption mode (ST403: NO), the processing ends.

Also, all flash memory modules return from low power consumption mode to regular mode synchronously in each RAID group (VDEV0-VDEV3). Accordingly, all flash memory modules in each RAID group can return to regular mode according to substantially the same flowchart as shown in FIG. 17.

Next, the method for returning from low power consumption mode to regular mode in units of RAID groups will be described below. FIG. 18 is a flowchart illustrating that method.

In step ST501, the storage adapter SA0 or SA1 commands any of the flash memory modules in a RAID group (e.g., VDEV0: flash memory module P00) to shift from low power consumption mode to regular mode. In other words, the storage adapter SA0 or SA1 issues an active command to the flash memory module P00.

In step ST502, the storage adapters SA0 or SA1 accesses the RAID group management table T3 illustrated in FIG. 12 and inspects the flash memory modules that belong to the same RAID group as the flash memory module that was ordered to shift to regular mode. For example, if the flash memory module P00 was ordered to shift to regular mode, the flash memory modules P10, P20, and P30 are inspected.

In step ST503, whether or not there is any flash memory module that has not shifted from low power consumption mode to regular mode is checked.

If any flash memory module in the RAID group has not shifted from low power consumption mode to regular mode (ST503: YES), the storage adapter SA0 or SA1 issues an active command to the flash memory module that has not shifted from low power consumption mode to regular mode in that RAID group, and the processing returns to step ST503.

In step ST503, if there is no flash memory module that has not shifted from low power consumption mode to regular mode in the RAID group, i.e. if all flash memory modules P10, P20, and P30 in the RAID group have shifted to regular mode (ST503: NO), the processing ends.

In this way, the storage adapter SA0 or SA1 can manage the electric power in the flash memory modules in units of RAID groups by synchronizing those flash memory modules to lower the power consumption. Accordingly, a great power consumption lowering effect can be acquired, and the load deriving from the power consumption control on the storage adapter SA0 or SA1 is reduced.

As described above, each flash memory module P00-P33 in this embodiment includes the flash memory controller MC and flash memory chip 405. The flash memory controller MC has the memory (SRAM) 404 that stores the address translation table T1 used for translating between the logical page address and the physical page address in the flash memory chip 405, and controls the first operation, i.e. regular mode of data read/write and the second operation, i.e. low power consumption mode in which the flash memory module operates in a standby state at lower power consumption than during regular mode of data read/write by decreasing the power supply voltage or lowering operating frequency.

The flash memory modules P00-P33 can detect and correct soft errors occurring in data in the address translation table T1 during low power consumption mode by verifying the data in the address translation table T1 during low power consumption mode. In other words, the power consumption in the flash memory modules P00-P33 can be saved, and the data in the address translation table T1 in the flash memory controller MC can be protected during low power consumption mode. Therefore, the address translation table T1 that becomes necessary if errors have accumulated does not have to be reconfigured when the flash memory modules return from low power consumption mode to regular mode, and the flash memory modules P00-P33 in low power consumption mode can immediately return to regular mode.

Moreover, the flash memory controller MC alternately executes the data verification for the time period t for verifying data in the address translation table T1 and the operation halt for the time period in which the operation of the flash memory controller MC is stopped, and the data verification time period t is shorter than the operation halt time period. Accordingly, the data verification is performed at low duty cycle.

If a spare flash memory module can be connected in advance to the storage adapter SA0 or SA1, data can be rebuilt when errors that cannot be corrected with the error correction information occur in any of the flash memory modules P00-P33 (defective module), by rebuilding the data from another flash memory module in the same RAID group to the spare flash memory module. Accordingly, the storage apparatus can immediately return to regular mode.

In the above described embodiment, the invention is used in the flash memory modules P00-P33 configured as illustrated in FIGS. 5 and 6 and the storage apparatus 100 using those flash memory modules P00-P33. However, the invention can be used not only in those flash memory modules and storage apparatus, but also in flash memory modules having other various configurations, storage apparatuses using those flash memory modules as storage media, and address translation table verification methods for the flash memory modules.

The invention can be widely used in various flash memory modules, storage apparatuses using those flash memory modules as storage media, and address translation table verification methods for the flash memory modules.

What is claimed is:

1. A flash memory module comprising:
a flash memory controller; and
at least one flash memory chip,
the flash memory controller having memory that stores an address translation table for translating between a logical page address and physical page address in the flash memory chip, and the flash memory controller controlling a first operation of reading/writing data and a second operation of operating in an idling state at lower power consumption than in the first operation by halting operation, decreasing power supply voltage, or lowering operating frequency,
wherein during the second operation, the flash memory controller alternately executes data verification in the address translation table for a first time period and operation halt in the flash memory controller operation for a second time period, and wherein the first period is shorter than the second period.

2. The flash memory module according to claim 1, wherein the address translation table further includes error correction information, and during the second operation a determination is made whether or not any error has occurred when verifying data in the address translation table by verifying the logical page address, physical page address, and error correction information stored in the address translation table and if it is determined that an error has occurred in the address translation table and that error can be corrected with the error correction information, a value corrected based on the error correction information is stored in the address translation table and if the error cannot be corrected only with the error correction information, data required for data correction is read from the flash memory chip and the address translation table is reconfigured.

3. The flash memory module according to claim 1, wherein the operation shifts from the first operation to the second operation according to an order from a host device connected to the flash memory controller.

4. The flash memory module according to claim 1, wherein the operation shift from the first operation to the second operation is controlled internally by the flash memory controller.

5. The flash memory module according to claim 1, wherein whether or not to perform data verification on the address translation table during the second operation is set.

6. A flash memory module comprising:
a flash memory controller; and
at least one flash memory chip,
the flash memory controller having memory that stores an address translation table for translating between a logical page address and physical page address in the flash memory chip, and the flash memory controller controlling a first operation of reading/writing data and a second operation of operating in an idling state at lower power consumption than in the first operation by halting operation, decreasing power supply voltage, or lowering operating frequency, wherein data in the address translation table is verified during the second operation, and wherein the operation shift from the first operation to the second operation and data verification in the address translation table are started after the completion of wear leveling processing performed by the flash memory controller.

7. The flash memory module according to claim 1, wherein the memory is SRAM.

8. A storage apparatus comprising:
a RAID group comprised of combining a plurality of flash memory modules, wherein each flash memory module of the plurality includes a flash memory chip and a flash memory controller for controlling data read/write from/to the flash memory chip, and wherein the flash memory controller of each flash memory module of the plurality stores an address translation table for translating between a logical page address and a physical page address in the respective flash memory chip, and the flash memory controller of each flash memory module of the plurality is configured to control a first operation of reading/writing data and a second operation of operating in an idling state at lower power consumption than in the first operation by halting operation, decreasing power supply voltage, or lowering operating frequency, and wherein the flash memory controller of each flash memory module verifies data in the respective address translation table during the second operation; and
a storage controller having cache memory that temporarily stores data read/written from/to at least one of the plurality of flash memory modules, wherein the storage controller is configured to issue a command so that if one of the flash memory modules that belong to the RAID group shifts from the first operation to the second operation, the other flash memory modules also shift to the second operation.

9. The storage apparatus according to claim 8 further comprising a spare flash memory module that verifies, after the address translation table is configured when connected to the storage controller, data in the address translation table during the second operation,
wherein if a failure has occurred in any of the flash memory modules, the data is rebuilt in the spare flash memory module from the flash memory modules that belong to the same RAID group as the defective flash memory module.

10. The storage apparatus according to claim 9, wherein the address translation table of at least one of the plurality of flash memory modules includes error correction information, and during the second operation a determination is made whether or not any error has occurred by verifying the logical page address, physical page address, and error correction information stored in the address translation table of the at least one of the plurality of flash memory modules during data verification in the address translation table of the at least one of the plurality of flash memory modules and if it is judged that an error has occurred in the address translation table of the at least one of the plurality of flash memory modules and that error can be corrected with the error correction information, a value corrected based on the error correction information is stored in the address translation table of the at least one of the plurality of flash memory modules, and if the error cannot be corrected only with the error correction information, data required for data correction is read from the flash memory chip of the at least one of the plurality of flash memory modules and reconfigures the address translation table of the at least one of the plurality of flash memory modules, and
wherein whether or not any failure has occurred in the at least one of the flash memory modules is determined based on whether or not the number of errors found during the data verification that cannot be corrected only with the error correction information is a prescribed number or larger.

11. The storage apparatus according to claim 8, wherein at least one of the flash memory modules is connected to the storage controller via a first network for transmitting/receiving data read/written from/to the flash memory chip of the at least one of the flash memory modules, and a second network for transmitting/receiving data for controlling electric power consumed during the second operation.

12. A data verification method for a storage apparatus including: a RAID group comprised of a plurality of flash memory modules, wherein each of the flash memory modules includes a flash memory chip, a memory for temporarily storing data read/written from/from the flash memory chip, and a flash memory controller having memory that stores an address translation table for translating between a logical page address and a physical page address in the flash memory chip, the flash memory controller controlling data read/write from/to the flash memory chip and also controlling a first operation of data read/write and a second operation of operating in an idling state at lower power consumption than in the first operation by halting operation, decreasing power supply voltage, or lowering operating frequency, the method comprising:
verifying data in an address translation table during the second operation; and
shifting, the operation in the rest of the flash memory modules that belong to the RAID group to the second operation, if one of the flash memory modules shifts from the first operation to the second operation.

13. The data verification method according to claim 12, further comprising rebuilding, if a failure occurs in any of the flash memory modules, data in a spare flash memory module that verifies data in the address translation table during the second operation from the flash memory modules that belong to the same RAID group as the defective flash memory module instead of from the defective flash memory module.

* * * * *